(12) United States Patent
Ishikawa et al.

(10) Patent No.: US 7,327,422 B2
(45) Date of Patent: Feb. 5, 2008

(54) OPTICAL COMPENSATION FILM, DISPLAY, AND PROCESS

(75) Inventors: Tomohiro Ishikawa, Rochester, NY (US); Dennis J. Massa, Pittsford, NY (US); Paul D. Yacobucci, Rochester, NY (US); Kelvin Nguyen, Rochester, NY (US); James F. Elman, Fairport, NY (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/796,746

(22) Filed: Mar. 9, 2004

(65) Prior Publication Data

US 2005/0200779 A1  Sep. 15, 2005

(51) Int. Cl.
*G02F 1/1335* (2006.01)
*C09K 19/00* (2006.01)

(52) U.S. Cl. ............... 349/117; 349/118; 349/119; 349/121; 428/1.1

(58) Field of Classification Search ........... 349/117, 349/118, 119, 121; 428/1.1–1.3
See application file for complete search history.

(56) References Cited

U.S. PATENT DOCUMENTS

| | | | | |
|---|---|---|---|---|
| 4,701,028 A | * | 10/1987 | Clerc et al. | 349/98 |
| 5,504,603 A | * | 4/1996 | Winker et al. | 349/117 |
| 5,750,641 A | * | 5/1998 | Ezzell et al. | 528/353 |
| 5,929,946 A | * | 7/1999 | Sharp et al. | 349/18 |
| 6,822,713 B1 | * | 11/2004 | Yaroshchuk et al. | 349/117 |
| 6,867,834 B1 | * | 3/2005 | Coates et al. | 349/119 |
| 6,937,310 B2 | * | 8/2005 | Elman et al. | 349/118 |
| 6,965,474 B2 | * | 11/2005 | Johnson et al. | 359/500 |
| 2001/0026338 A1 | | 10/2001 | Aminaka | |
| 2003/0086033 A1 | | 5/2003 | Sasaki et al. | |
| 2003/0193636 A1 | | 10/2003 | Allen et al. | |
| 2003/0219549 A1 | | 11/2003 | Shimizu | |
| 2004/0051831 A1 | * | 3/2004 | Yu et al. | 349/117 |
| 2004/0183973 A1 | * | 9/2004 | Roska et al. | 349/117 |
| 2004/0184150 A1 | * | 9/2004 | Johnson et al. | 359/500 |
| 2005/0219447 A1 | * | 10/2005 | Slaney et al. | 349/117 |

FOREIGN PATENT DOCUMENTS

| | | |
|---|---|---|
| EP | 0 646 829 | 4/1995 |
| EP | 0 774 683 | 5/1997 |
| EP | 1 380 877 | 1/2004 |
| EP | 1 387 210 | 2/2004 |

* cited by examiner

*Primary Examiner*—Mike Qi
(74) *Attorney, Agent, or Firm*—Westerman, Hattori, Daniels & Adrian, LLP.

(57) ABSTRACT

A multilayer optical compensation film comprises one or more optically anisotropic layers X and one or more optically anisotropic layers Z wherein, said each layer X has its optic axis tilted with respect to the plane of said multilayer compensation film, and said each layer Z comprises amorphous polymer with glass transition temperature Tg above 180C°, and satisfies particular relations. The film is readily manufactured and provides the required optical property for proper compensation of LCDs.

35 Claims, 7 Drawing Sheets

OPTICAL COMPENSATION FILM, DISPLAY, AND PROCESS

CROSS REFERENCE TO RELATED APPLICATIONS

Reference is made to commonly-assigned co-pending U.S. patent application 2003/0193637, entitled Bend Aligned Nematic Liquid Crystal Imaging Display with Compensation Film, and application Ser. No. 10/413,106, entitled Compensation Films for LCDs, the disclosure of which is incorporated herein.

FIELD OF THE INVENTION

The present invention relates to a multilayer optical compensation film useful for a liquid crystal display comprising one or more optically anisotropic layers X and one or more optically anisotropic layers Z wherein, said each layer X has their optic axis tilted with respect to the plane of said multilayer compensation film, and said each layer Z comprises amorphous polymer with glass transition temperature, Tg, above 180C°, and satisfy two specified relations.

BACKGROUND OF THE INVENTION

Liquid crystals are widely used for electronic displays. In these display systems, a liquid crystal cell is typically situated between a pair of polarizers and analyzers. An incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source, including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, and electronic games for which light-weight, low-power consumption and long-operating life are important features.

Contrast, color reproduction, and stable gray scale intensities are important quality attributes for electronic displays which employ liquid crystal technology. The primary factor limiting the contrast of a liquid crystal display (LCD) is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction. This is a common problem with most of the display modes such as Vertically Aligned (VA), Optically Compensated Bend (OCB), and Twisted Nematic (TN) mode.

LCDs are quickly replacing CRTs as monitors for desktop computers and other office or household appliances. It is also expected that the number of LCD television monitors with a larger screen size will sharply increase in the near future. However, unless problems of viewing angle dependence such as coloration, degradation in contrast, and an inversion of brightness are solved, LCDs application as a replacement of the traditional CRT will be limited.

One of the common methods to improve the viewing angle characteristic of LCDs is to use compensation films. As is well known to those skilled in the art, the optical compensation of LCDs is often aimed at prevention of the light leakage in the dark states such as OFF state of VA and ON state of Normally-White TN and OCB modes. In these dark states, the liquid crystal optic axis inside of the liquid crystal cell takes the configuration shown schematically in FIG. 4. FIG. 4 is a cross section of a liquid crystal cell where the liquid crystal optic axis 403 changes its direction in the cell thickness direction z. Around the mid-plane 401 of the liquid crystal cell, the liquid crystal optic axis 403 is sufficiently perpendicular to the plane of the cell boundary 405. As the liquid crystal used in the liquid crystal cell for LCDs is positively birefringent, this part represents the positive C-plate. On the other hand, the optic axis 403 changes direction in the vicinity of the cell boundaries 405. It is tilted with respect to the plane of the boundary of liquid crystal cell. Thus it has a positive O-plate property. To optically compensate such a state, the compensation film has to have a similar symmetry containing C-plate and O-plate components. In order to counter the positive C part of the liquid crystal cell, the compensation film has to have a negative C element. However, as is well known in the art, a positive O component of the cell can be compensated by a negative O component, positive O component or combination of both. Thus the compensation film can have the configuration, for example, Negative C+Positive O, Negative C+Negative O, Negative C+Positive O+Positive O etc. Compensation films with these configurations have a physical structure containing optically anisotropic layers disposed on an optically transparent substrate. An O-plate layer can be made of, for example, liquid crystal polymers. As it is necessary to align the optic axis of the liquid crystal polymer in the desired direction, an alignment layer is often deposited between the optically anisotropic layer and substrate or between the two optically anisotropic layers. It is possible that the compensation films include other auxiliary layers such as adhesion promotion layers, barrier layers, and antistatic layers. Adhesion promotion layers can be put between the alignment layer and the substrate. This layer may become necessary when there is not sufficient mutual adhesion between the substrate and the alignment layer. It may be also the case that an adhesion promotion layer is placed between the substrate and O-or C-plate layers.

One often has to put barrier layer between the alignment layer and the substrate or between the layers with different chemical compositions but having the same optical properties. Typical liquid crystal alignment layers are susceptible to chemical contamination. Placing the barrier layer can prevent an undesired diffusion of compounds from the substrate to alignment layer. In order to promote static discharge, one or more antistatic layers can be placed within the compensation film. This would prevent the sticking of dust particles on the film surfaces.

As is well known in the art, methods other than deposition of liquid crystal polymer to generate O-plates are possible. This includes tilted deposition of inorganic materials and tilted holographic layers. These layers with O-plate properties are disposed on the transparent substrate, for example, triacetylcellulose (TAC), cellulose acetate butyrate (CAB), cyclic polyolefin and glass. Some polymeric substrates, such as TAC, have negative C property (thus negative Rth).

U.S. Pat. No. 5,583,679 and U.S. Pat. No. 5,805,253 disclose the compensation film with a discotic liquid crystal compound layer disposed on the substrate for TN-LCD and OCB-LCD, respectively. The discotic compound changes its tilt in optic axis with respect to the film plane, and changes its direction in the layer thickness direction; therefore a discotic liquid crystal layer is a negative O-plate. U.S. Pat. No. 5,583,679 calls for the use of a polymeric substrate such as polynorbonene type polymer and TAC. The substrate is required to have $-150$ nm $\leq$ Rth $\leq$ $-30$ nm and Rin being less than 20 nm. This property is essentially that of a negative C-plate. For OCB cell, U.S. Pat. No. 5,805,253 discloses the use of a substrate with $-400$ nm $\leq$ Rth $\leq$ $-50$ nm.

U.S. Pat. No. 5,619,352 discusses the use of Negative C combined with Positive O-plate for gray scale compensation of TN-LCD. Various combinations of A, Positive O and Negative C-plates are disclosed.

In the prior art, a need for negative C-plate with relatively large Rth is mentioned in combination with positive or negative O-plate. Some prior arts only specify the necessary value range for Rth but fail to provide the method of its generation. Others put examples of polymeric substrates. However, most of the polymeric substrates known in the art typically have $|\Delta n_{th}| \sim 1 \times 10^{-3}$ or less. Thus in order to obtain Rth=$-100$ nm, the necessary substrate thickness would be 100 μm or larger. For example, the most commonly used substrate TAC provides only Rth$\sim$$-50$ nm for the thickness of 80 μm. Certainly, doubling the thickness or lamination of substrates increases the negative value of Rth. This, however, also thickens the liquid crystal display unit. Therefore, it is desirable to increase the negative value of Rth of the compensation films without significant increase in the compensation film thickness. Various methods have been proposed that can be used to obtain a sufficiently large negative Rth value.

US 2001/0026338 discloses a use of retardation increasing agent in combination with TAC. The retardation-increasing agent is chosen from aromatic compounds having at least two benzene rings. The problems with this method is the amount of the doping of the agent. To generate the desired effects of increasing Rth, the necessary amount of agent is high enough to cause coloration.

As is well known in the art, cholesteric liquid crystal (CHLC) can be used to obtain Negative C-plate. The pitch of the CHLC is shorter than the wavelength of the visible light, thus properly aligned CHLC exhibits form birefringence giving negative Rth. Sasaki et al. propose (US 2003/0086033) use of short pitch CHLC disposed on thermoplastic substrate. CHLC, however, usually is costly material, and the alignment process would only increase the manufacturing cost.

Thus, it is a problem to be solved to provide a multilayer optical compensation film comprising Positive O-plate or Negative O-plate or both, and Negative C-plate with sufficiently large negative value of Rth. The Negative C-plate of said compensation film should be easily manufactured, be low cost, and should offer ease in controlling negative Rth value without significantly increasing the thickness of the compensation film so that the film is readily manufactured and provides the required optical property for proper compensation of LCDs.

SUMMARY OF THE INVENTION

The present invention provides a multilayer optical compensation film comprising one or more optically anisotropic layers X and one or more optically anisotropic layers Z wherein, said each layer X has its optic axis tilted with respect to the plane of said multilayer compensation film, and said each layer Z comprises amorphous polymer with glass transition temperature above 180C°, and satisfies the following two relations:

$$|nx-ny|<0.001 \quad (1)$$

$$\Delta n_{th}=nz-(nx+ny)/2<-0.005 \quad (2).$$

wherein:
"nx" and "ny" are indices of refraction in the film plane parallel to the x and y directions which represent orthogonal directions in the plane of the film;
"nz" is the index of refraction in the z-direction that corresponds to the film-thickness direction; and
"$\Delta n_{th}$" is the out of-plane birefringence.

The invention also provides a display employing the film.

The invention multilayer optical compensation film is readily manufactured and provides the required optical property for proper compensation of LCDs.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
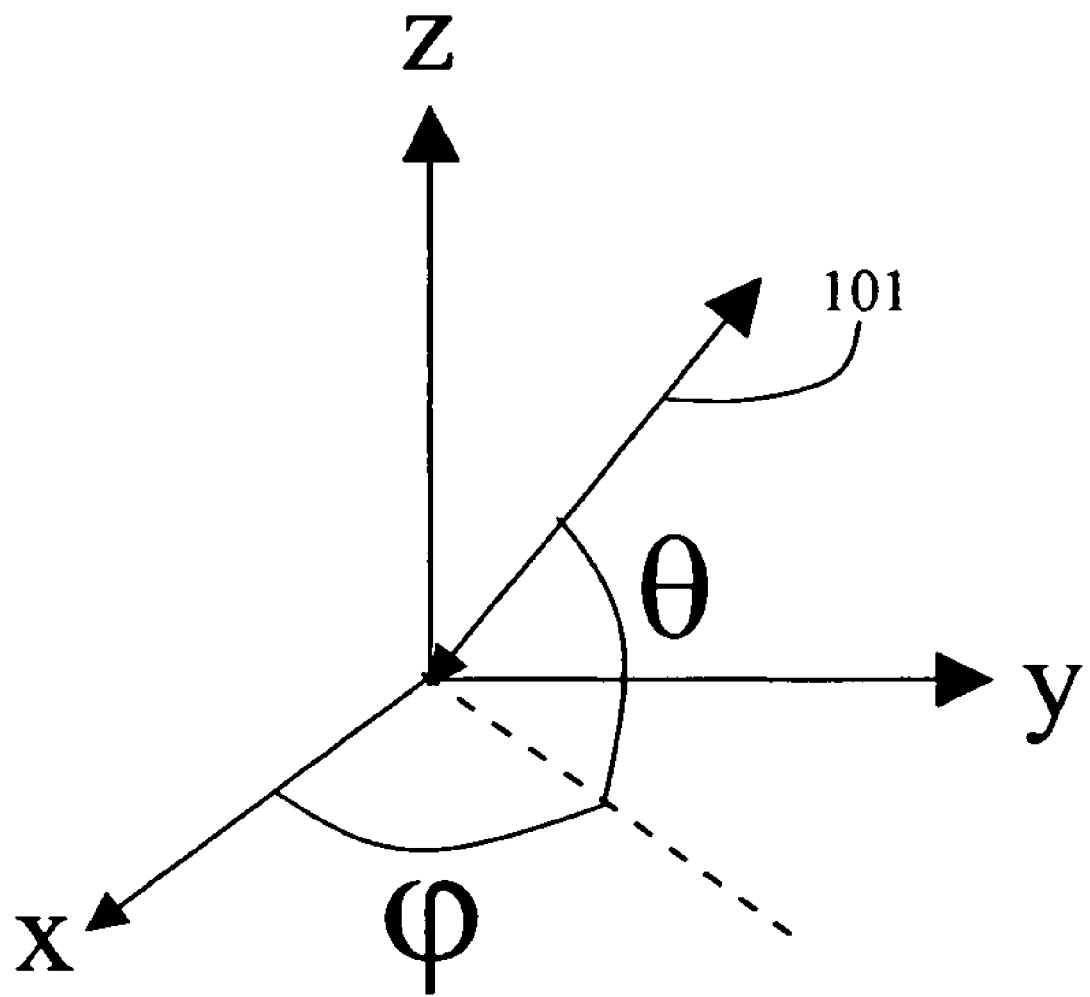
FIG. 1 shows the definitions of azimuthal angle φ and tilt angle θ of the optic axis.

The following definitions apply to the description herein:
Optic axis 101 refers to the direction in which propagating light does not see birefringence. Its direction is described by the azimuthal angle φ and the tilt angle θ, FIG. 1. As can be seen in the figure, the angle θ measures the angle between the plane and the optic axis and φ is an angle measured in the plane with respect to a reference direction.

ON and OFF state refers to the state with and without applied voltage to the liquid crystal cell.

Figure 2A:
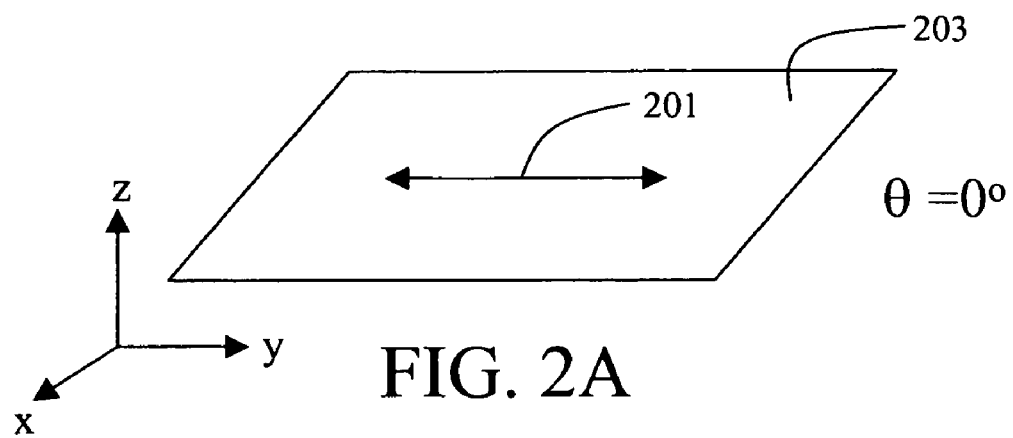
FIG. 2A, FIG. 2B and FIG. 2C show the optic axis direction with respect to the plane of the plate (x-y plane) in A, C and O-plate, respectively.

A-plate (FIG. 2A), C-plate (FIG. 2B) and O-plate (FIG. 2C) are the plates in which the optic axis 201 is in plane of the film or plate 203 (x-y plane), θ=0° (FIG. 2A), perpendicular to the plane, θ=90° (FIG. 2B) and tilted with respect to the plane, 0°<θ<90° (FIG. 2C) of the plate, respectively. In some cases, θ of the optic axis varies in the plate thickness direction while φ is fixed, thus the plate does not possess the definite optic axis direction. This case is also included in the O-plate. Each plate can be a positive or negative plate depending on the sign of the birefringence (ne-no), where ne and no are extraordinary and ordinary indices of refraction.

Figure 3:
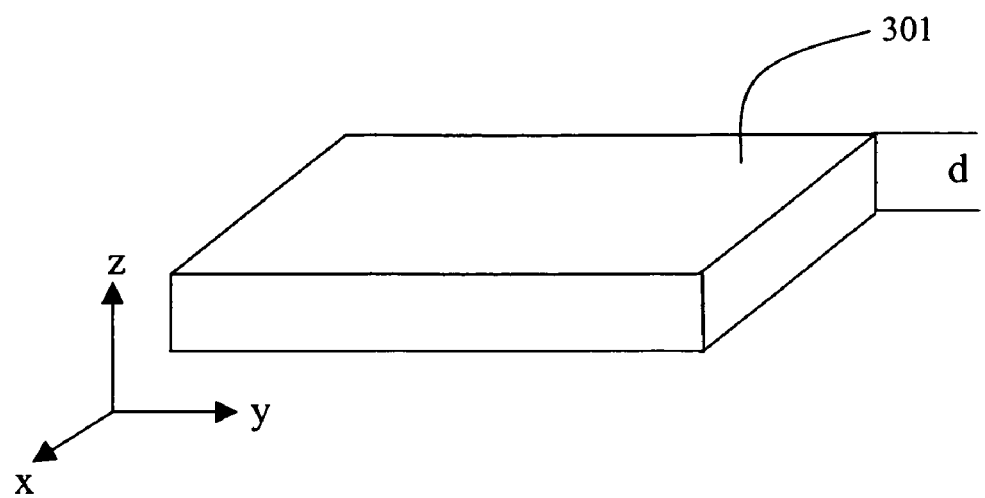
FIG. 3 is a view of a layer with thickness d and x-y-z coordinate system attached to the layer.
Figure 4:
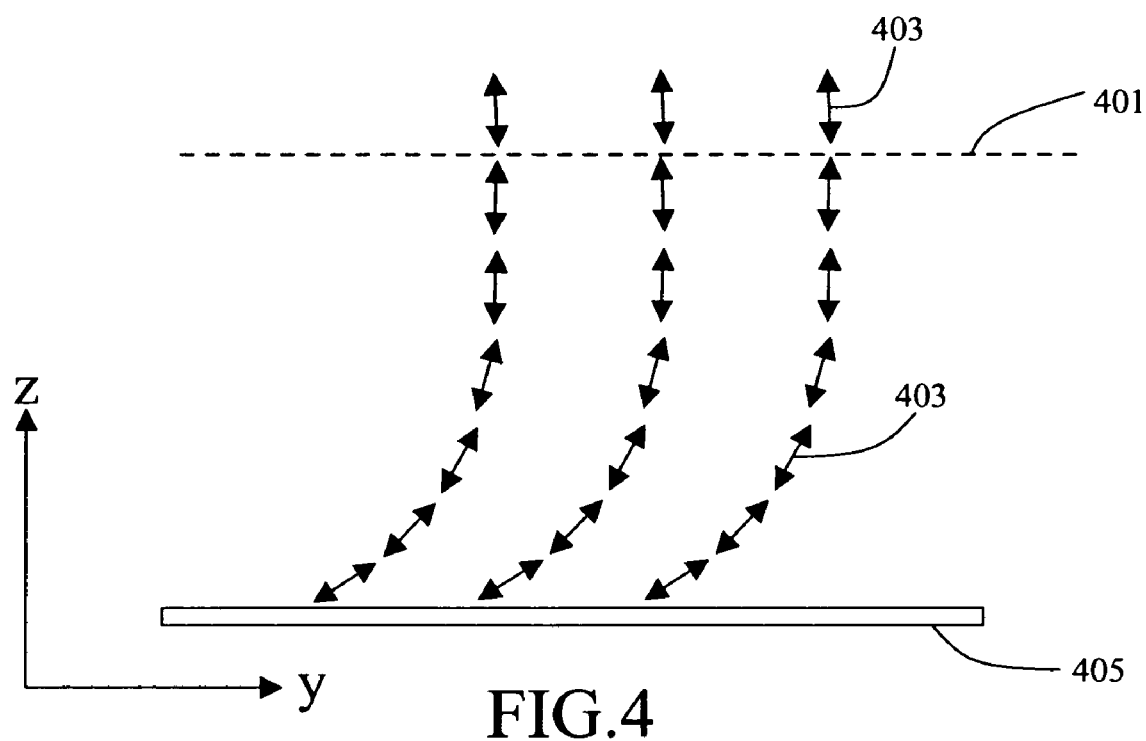
FIG. 4 is a cross sectional schematic showing the direction of optic axis in the middle and near the boundary of liquid crystal cell.

Out of-plane phase retardation $R_{th}$, of a plate 301 shown in FIG. 3 is a quantity defined by $[nz-(nx+ny)/2]d$. "nz" is the index of refraction in the z-direction that corresponds to the plate-thickness direction. "nx" and "ny" are indices of refraction in the plane parallel to x and y directions, respectively, which represent orthogonal direction in the plate. d is a thickness of the plate 301. The quantity $[nz-(nx+ny)/2]$ is referred to as out-of-plane birefringence, $\Delta n_{th}$. If $nz>(nx+ny)/2$, $\Delta n_{th}$ and Rth are positive. If $nz<(nx+ny)/2$, $\Delta n_{th}$ and Rth are negative. The values of $\Delta n_{th}$ and Rth hereafter are given at the wavelength, $\lambda=550$ nm.

In-Plane retardation, Rin of a plate 301 is defined by $|nx-ny|d$. Its value, herein after is given at $\lambda=550$ nm.

Amorphous means a lack of long-range order. Thus an amorphous polymer does not show long-range order as measured by techniques such as X-ray diffraction. In this case amorphous means that the optical compensator would not produce any sharp diffraction peaks when exposed to X-ray diffraction analysis. Crystalline polymers, liquid crystal molecules and crystalline inorganic materials would produce such sharp peaks when subjected to such X-ray diffraction analysis. Such amorphous materials are desirably suitable to be solvent cast or coated such as TAC, polycarbonates, cyclic polyolefins, polyesters, and polyimides.

Chromophore is defined as an atom or group of atoms that serve as a unit in light absorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocylic aromatic such as phenyl, naphthyl, biphenyl, thiophene, bisphenol), sulfone, and azo or combinations of these chromophores. A non-visible chromophore is one that has an absorption maximum outside the range of $\lambda=400-700$ nm.

Contiguous means that articles are in contact to each other. In contiguous two layers, one layer is in direct contact to the other. Thus, if a polymer layer is formed on the substrate by coating, the substrate and the polymer layers are contiguous.

Reference will now be made to the drawings in which the various elements of the present invention will be given numerical designations and in which the invention will be discussed so as to enable one skilled in the art to make and use the invention.

The present invention provides a multilayer optical compensation film comprising one or more optically anisotropic layers X and one or more optically anisotropic layers Z wherein, said each layer X has its optic axis tilted with respect to the plane of said multilayer compensation film, and said each layer Z comprises amorphous polymer with Tg above 180C°, and satisfies the following two relations:

$$|nx-ny|<0.001 \quad (1)$$

$$\Delta n_{th}=nz-(nx+ny)/2<-0.005 \quad (2).$$

Figure 2B:
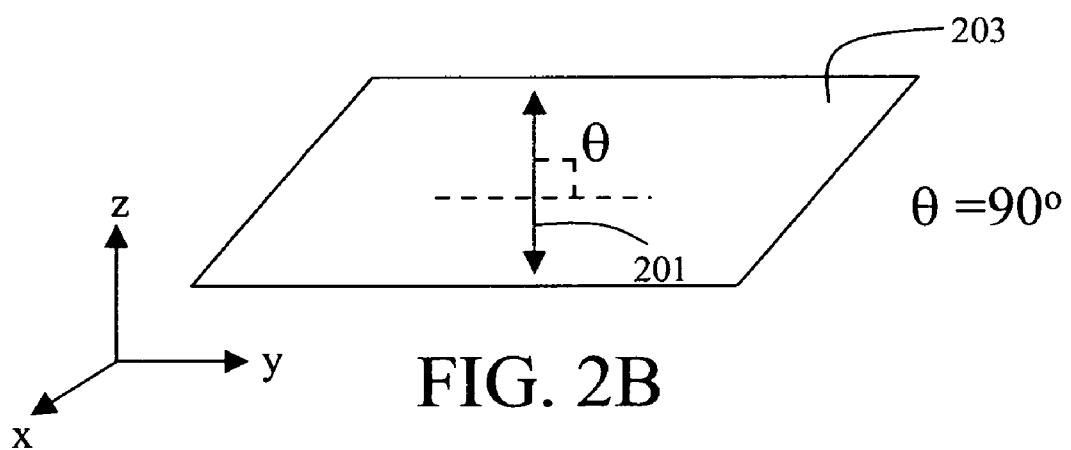
Figure 2C:
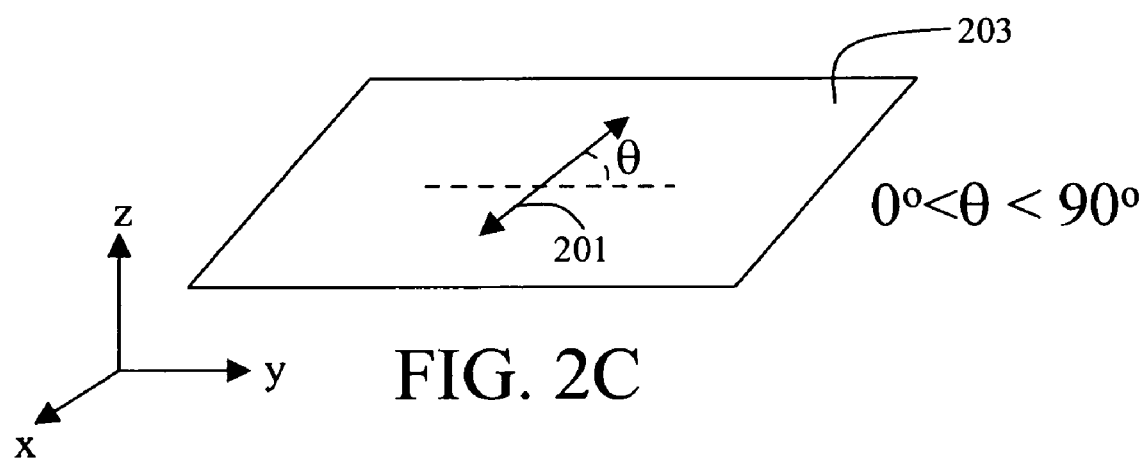

Since the optic axis is tilted with respect the plane of the compensation film, an X layer is an O-plate (FIG. 2C). Thus the optic axis in an X layer is neither in the plane of the layer (x-y plane) as it is the case in A-plates (FIG. 2A) nor perpendicular (C-plate, FIG. 2B). The sign depends on the compound that makes the X layer. If the O-plate is made of a discotic compound, it is negative, whereas a calamitic (or so-called rod-like) compound gives positive O-plate. Hereinafter, however, an O-plate includes both positive and negative cases. A Z layer satisfies the condition set by equations (1) and (2). Equation (1) indicates that there is essentially no birefringence in the plane of the compensation film. Therefore, the in-plane retardation Rin of the Z layer is small. The property of Z layer is essentially that of a C-plate (FIG. 2B). The sign of the C-plate is negative, according to equation (2). Therefore the Z layer has a property of a negative C-plate with larger negative $\Delta n_{th}$ than $-0.005$.

Figure 5A:
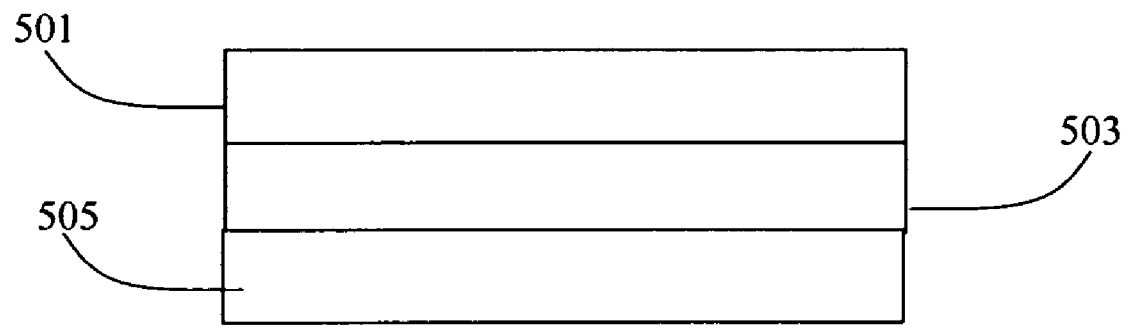
FIG. 5A, FIG. 5B, FIG. 5C, FIG. 5D, FIG. 5E and FIG. 5F are cross sectional schematics of the exemplary compensation films according to the invention.
Figure 5B:
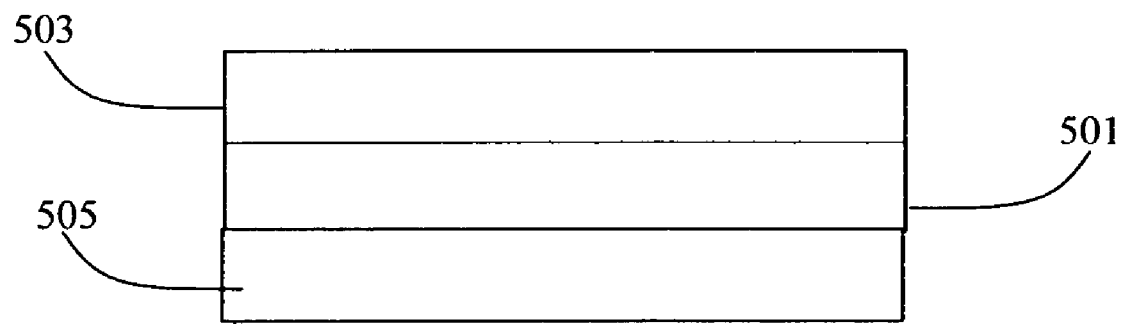
Figure 5C:
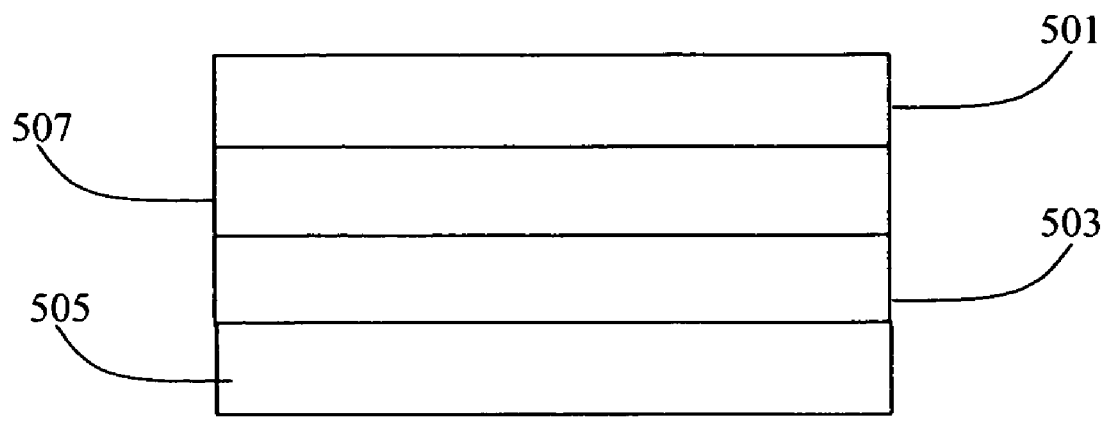
Figure 5D:
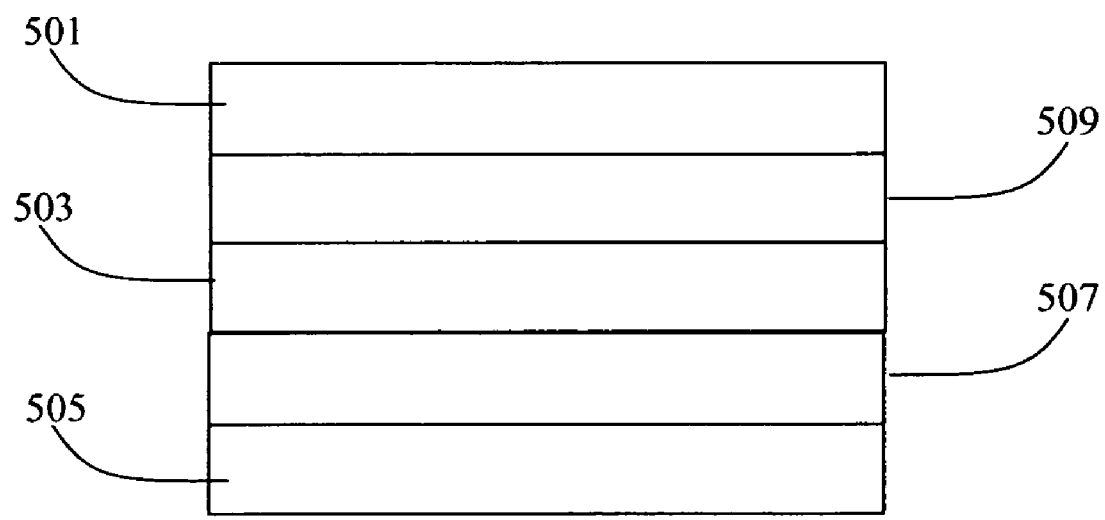
Figure 5E:
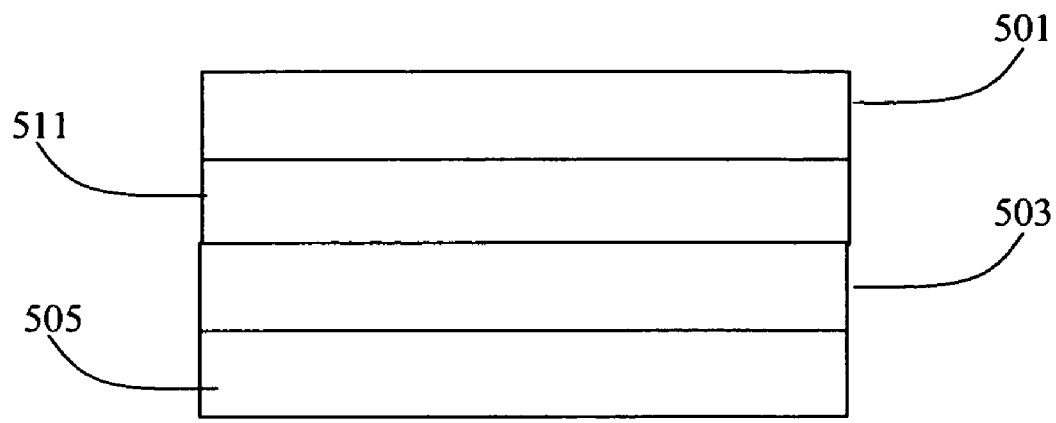
Figure 5F:
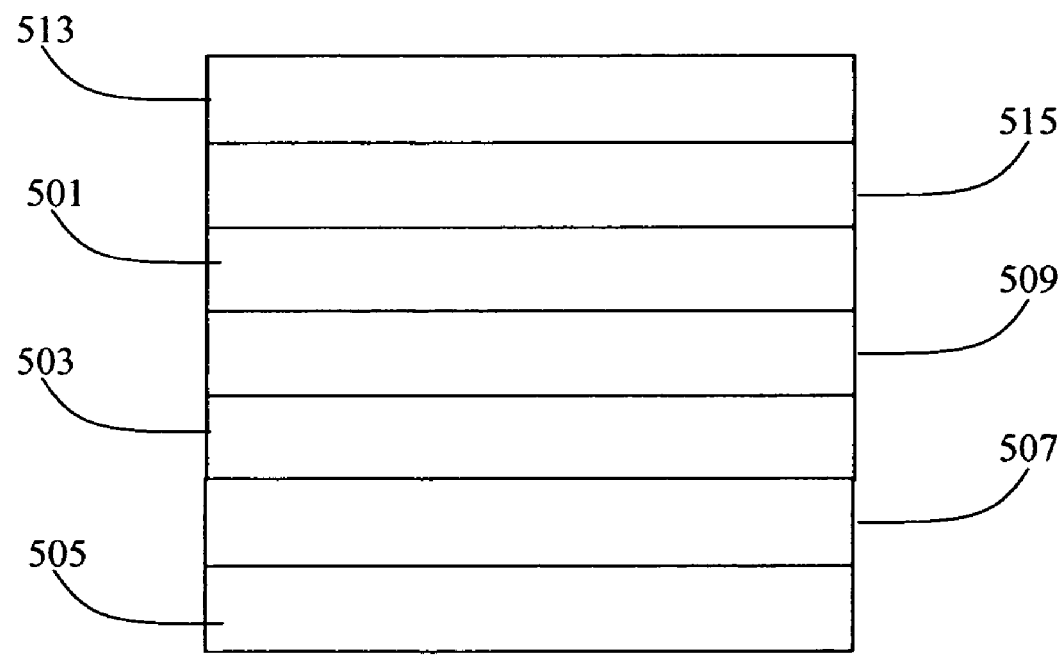

FIGS. 5A, 5B, 5C, 5D, 5E and 5F show the schematic cross sections of exemplary compensation films according to the invention. Thickness in the figures may not scale to the actual ones in the compensation films. In the structure shown in FIG. 5A, an X layer 501 and a Z layer 503 are disposed directly on the substrate 505. In FIG. 5B, the order is opposite. The compensation film shown in FIG. 5C has an auxiliary layer 507 inserted between the X 501 and the Z layer 503. FIG. 5D is a structure where two auxiliary layers 507, 509 are inserted between X layer 501 and Z layer 503, Z layer 503 and the substrate 505, respectively. In some cases, two Z layers 503, 511 can be placed between the substrate and a X layer 501 and the substrate 505, FIG. 5E. There can be more than one X layer and Z layer placed on the substrate with more than one auxiliary layer. Such is the case in FIG. 5F, where two X layers 501, 513 and a single Z layer 503 is disposed on the substrate 505 along with three axially layers 507, 509, 515. Those who are skilled in the art can conceive other possible structures that are appropriate for individual applications.

X layers have a property of O-plate, FIG. 2C. For the LCD compensation, one can use both positive and negative O-plate or a combination of both. Multilayer of O-plate is also possible. Thus a typical O-plate structure can be, for example, single negative O-plate, single positive O-plate, or combination of negative O-plate and negative O-plate, positive O-plate and positive O-plate or negative O-plate and positive O-plate. Other combinations are also possible. In order to generate an O-plate, various means can be used, such as liquid crystal polymer with tilted optic axis, inorganic crystal deposition and tilted holographic layers. Tilted deposition of inorganic compounds such as $Ta_2O_5$, $SiO_2$ give O-plate property. The tilt in the optic axis in this case is controlled by the deposition angle. Mane-Si Laure Lee et al. (Society of Information Display, Digest of technical Papers 2003, pages 684-687) applied volume holographic film to compensate the TN-LCD. Their holographic film has two characteristics: tilted normal direction of hologram with respect to the plane of the compensation film and short periodicity so that it has a negative form birefringence. Because of these, the film essentially functions as a negative O-plate. Most commonly, however, O-plates are generated by liquid crystal polymer. The sign of the O-plate depends on the kind of liquid crystal polymer used. Discotic liquid crystal is used for negative O-plate whereas positive O-plate is made from calamitic liquid crystal (so-called "rod-like" nematic liquid crystal). As it is necessary to fix the direction of liquid crystal polymer, an alignment layer is often used. For example, the auxiliary layer 507 shown in FIG. 5C can be an alignment layer. Various alignment layers are available: rubbed polymer surface, vacuum deposited inorganic compound layer and photo-sensitive polymeric layers. Polymer liquid crystal can be solvent coated on the alignment layer. As solvent evaporates, liquid crystal polymer takes the direction enforced by the alignment layer. In other cases, liquid crystal monomer can be coated and subsequently polymerized. In any cases, it is essential to freeze the optic axis of liquid crystal polymer for stable application of the compensation film. O-plates made from liquid crystal polymer often exhibit continuous change in the optic axis in the plate-thickness direction. This is due to the fact that the interfacial property between liquid crystal polymer and alignment layer is different from that of liquid crystal polymer-air interface. Thus, the θ of liquid crystal polymer optic axis at the two interfaces are different resulting in the O-plate with a change in θ in the thickness direction. This so-called "splay" in the optic axis is often more desirable than the constant tilt. The thickness of X layers, θ and other attributes are adjusted so as to optimize the performance of the compensation films. For example, θ can be changed by using different alignment layers, processing condition (e.g., rubbing strength of the alignment layer) and other methods known in the art.

The optically anisotropic Z layer is coated from a solution containing a polymer that yields high negative birefringence that is more negative than −0.005 upon solvent coating. The optical property of Z layer is essentially that of negative C-plate. The optic axis is perpendicular (FIG. 2B) to the plane of the layer and birefringence is negative. The three indices of refraction of Z layer satisfy relations:

$$|nx-ny|<0.001 \quad (1)$$

$$\Delta n_{th}=nz-(nx+ny)/2<-0.005 \quad (2).$$

To produce negative $\Delta n_{th}$ (or $R_{th}$), polymers with positive intrinsic birefringence are used. Such polymers usually contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone. Examples of such polymers are polyesters, polycarbonates, polyimides, polyetherimides, and polythiophenes. One could also add fillers and non-polymeric molecules to these polymers for the second layer. Desirably, polymers to be used in the Z layers will not have chromophores off of the backbone. An example of such an undesirable polymer with chromophores in and off the backbone would be polyarylates possessing the fluorene group. The Tg of the polymers used in the Z layer is significant. It should be above 180° C. to achieve the desired results. The polymers used in the Z layers could be synthesized by a variety of techniques: condensation, addition, anionic, cationic or other common methods of synthesis could be employed. Because of the condition (2) for Z layer, one can obtain sufficient negative Rth from Z layer without significant increase in the thickness of compensation film. For example, for Rth of about −150 nm, the maximum necessary thickness of Z layer would only be about 4 μm. The thickness of each Z layer typically should be from 0.1 μm to 20 μm. Conveniently it should be from 1.0 μm to 10 μm. Desirably it should be from 2 μm to 8 μm. Depending on the physical, chemical and mechanical properties, the Z layer can also act as the alignment layer. This would be a case, for example, for the compensation film with the structure shown in FIG. 5A, where X layer 501 is consists of liquid crystal polymer. The Z layer 503 contiguous to the substrate 505 may be mechanically rubbed or exposed to an electromagnetic radiation (e.g., polarized Ultra Violet) so as to generate desirable orientation of optic axis. Such an alignment procedure typically does not change bulk property of Z layer significantly, so it can retain the optical property specified by relations (1) and (2).

Besides alignment layers, two other important auxiliary layers are barrier layer and adhesion promotion layer. A barrier layer prohibits diffusion of the chemical species that have an adverse effects on the optical property of the X and Z layers or hinder alignment effects of the alignment layer. For example, the barrier layer becomes necessary, if the substrate 505 is TAC film. Typically TAC contains low-molecular weight plasticizer to improve mechanical properties. It is possible that the plasticizer migrates through the alignment layer, alters the interfacial property between X and alignment layers, and changes θ of optic axis within the X layer. Barrier layers can be placed between X and Z layer, two X layers, two Z layers, alignment layer and a Z layer, any other places where chemical decoupling is necessary to maintain the optical properties of each X and Z layers.

Adhesion promotion layers can be placed between any two constituent layers of a compensation film where adhesion between two adjacent layers needs to be enhanced. For example, it is useful between hydrophilic and hydrophobic layers.

In many cases, a single layer can function as both barrier and adhesion layers. In order to optimize both functionalities, the layer can contain two or more polymers. For example, the layer may contain a water-soluble polymer such as gelatin and a water dispersible polymer such as a polyesteriomonomer. Alternatively, the barrier layer may contain two different water dispersible polymers such as polyesterionomer and polyurethane.

Z layers can also function as barrier layer or adhesion promotion layer. Consider the case, where two Z layers are placed between the X layer and the substrate. Both Z layers satisfy relations (1) and (2) and have negative C-plate property. However, the one close to the substrate also functions as a barrier layer that prevents the diffusion of chemical species. If necessary, one can choose a Z layer such that the adhesion between the substrate and the rest of the layers in the compensation film is enhanced. The second Z layer can provide alignment direction to the optic axis of constituent material of the X layer. Also, it is possible that one Z layer can play the role of barrier layer and alignment layer simultaneously. Such a case also applies to X layers. In one embodiment, one X layer can act as an alignment layer for yet another X layer on top of it. This case occurs when the bottom X layer can be rubbed to fix the alignment direction.

The combined thickness of the multilayer optical compensation film should be less than 50 μm. Typically it should be from 4 μm to 45 μm. Desirably it should be from 5 μm to 20 μm.

The optical compensation films according to the invention can be used in combination with various modes of liquid crystal displays.

Figure 6:
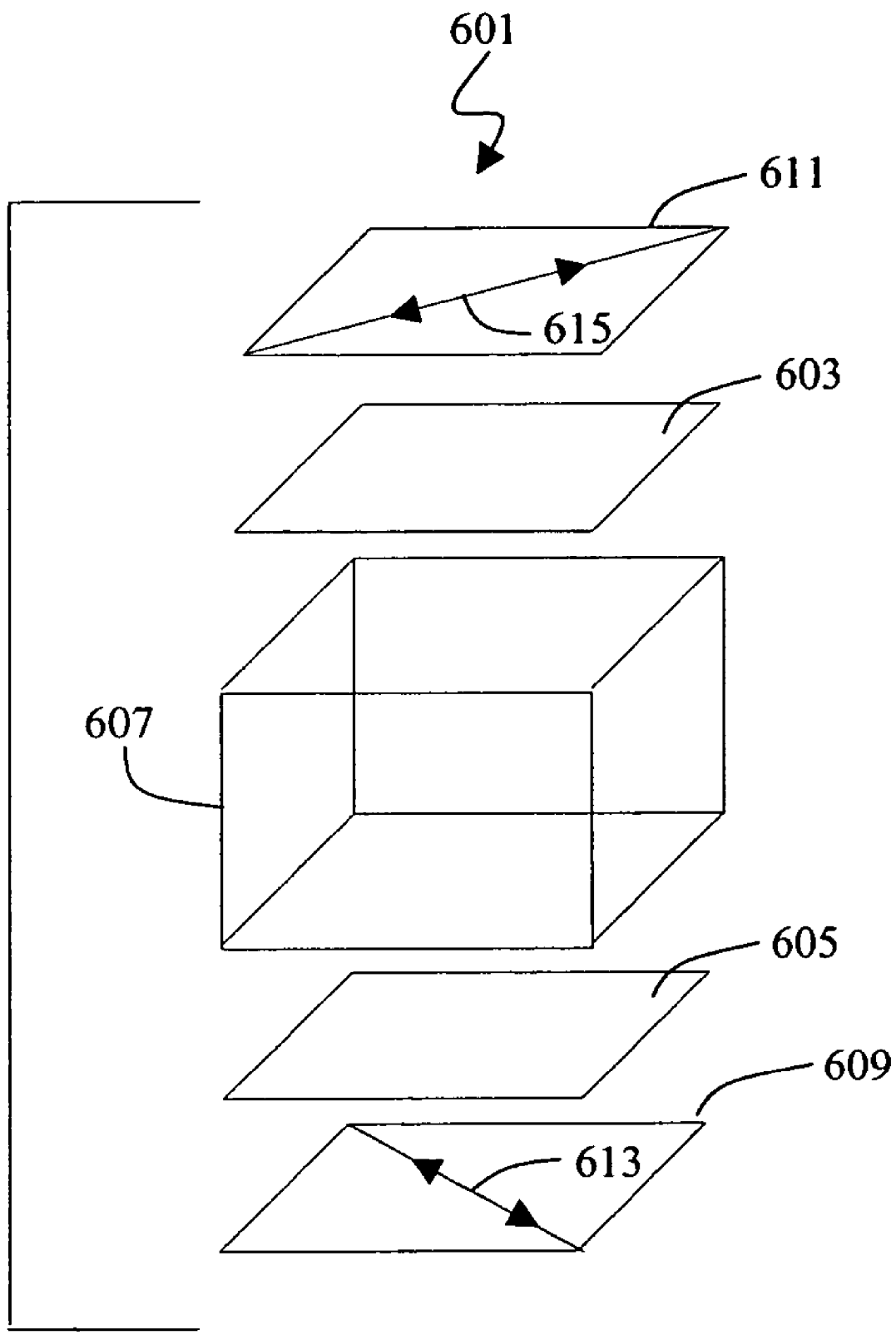
FIG. 6 is a schematic of TN-LCD with compensation films according to the invention.

The compensation film disclosed in the co-pending U.S. patent application Ser. No. 10/413,106, uses two X layers with positive O-plate property having retardation values and different θ both within prescribed limitations. The azimuthal angle between the two O-plates is 90±10°. These two X layers are combined with a Z layer. FIG. 6 is a schematic of the TN-LCD 601 with compensation films 603, 605 inserted on the both sides of the liquid crystal cell 607. Two polarizers 609, 611 are placed with their transmission axes 613, 615 being essentially perpendicular to each other. The compensation films 603, 605 have the structure shown in FIG. 5F. The first X layer 501 has an average θ of 50 degrees whereas the second X layer 513 has 5 degree average tilt angle θ. The Z layer 503 has a negative C-plate property with Rth=−200 nm. The auxiliary layers 509, 515 are alignment layers that fix both azimuthal (φ and tilt θ angles of X layers 501, 513 on top. The third auxiliary layer 507 is an adhesion promotion layer. Typical single layer of polymeric substrates such as TAC certainly do not provide negative Rth value in this range (~−200 nm). Thus, insufficient negative Rth can be supplemented by disposing Z layer 503 on top of the polymeric substrate 505. OCB cells can be also compensated by two X layers having positive O-plate property combined with a layer with Negative C character as it is disclosed in the co-pending U.S. patent application 2003/0193637. Though depending on the cell thickness, OCB compensation also requires negative Rth that have to be supplied by Z layer.

In the above example shown in FIG. 6, the compensation film is placed on the both sides of liquid crystal cell. However, it is also possible to use the compensation film on one side.

Compared to the prior art, embodiments of the present invention can provide enhanced optical compensation in a relatively thin (<200 μm) structure without using any retardation increasing agent (as disclosed in US2001/0026338) that causes coloration, or do not require the use of cholesteric liquid crystal compounds and its alignment procedure (as disclosed in US 2003/0086033). The compensation film according to the current invention can be easily manufactured.

The following specific examples are presented to particularly illustrate the invention and should not be construed to place limitations thereon.

EXAMPLE 1

(Synthesis of Polymer 1, "Z" Layer Polymer)

To a stirred mixture of 4,4'-hexafluoroisopropylidene-diphenol (23.53 g, 0.07 mole), 4,4'-(2-norbornylidene)bisphenol (8.4 g, 0.03 mole) and triethylamine (22.3 g, 0.22 mole) in methyl ethyl ketone (100 mL) at 10° C. was added a solution of terephthaloyl chloride (18.27 g, 0.09 mole) and isophthaloyl chloride (2.04 g, 0.01 mole) in methyl ethyl ketone (60 mL). After the addition, the temperature was allowed to rise to room temperature and the solution was stirred under nitrogen for 4 hours, during which time triethylamine hydrochloride precipitated in a gelatinous form and the solution became viscous. The solution was then diluted with toluene (160 mL) and washed with dilute hydrochloric acid, (200 mL of 2% acid) followed three times by water (200 mL). The solution was then poured into ethanol with vigorous stirring, and a white bead like polymer precipitated, collected and dried at 50° C. under vacuum for 24 hours. The glass transition temperature of this polymer was measured by differential scanning calorimetry to be 265° C.

Poly(4,4'-hexafluoroisopropylidene-bisphenol-co-4,4'-(2-norbornylidene) bisphenol) terephthalate-co-isophthalate.

Polymer 1

Other useful polymers for the Z layer would include: 1)poly(4,4'-hexafluoroisopropylidene-bisphenol) terephthalate-co-isophthalate, 2)poly(4,4'-hexahydro-4,7-methanoindan-5-ylidene bisphenol) terephthalate, 3)poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate, 5)poly(4,4'-hexahydro-4,7-methanoindan-5-ylidene)-bisphenol-co-(4,4'-isopropylidene-2,2',6,6'-tetrabromo)-bisphenol terephthalate, or 6)poly(4,4'-isopropylidene-bisphenol-co-4,4'-(2-norbornylidene)bisphenol) terephthalate-co-isophthalate or copolymers of any of the foregoing.

EXAMPLE 2

(Barrier A Formulation)

Sancure 898 (a polyurethane dispersed in water at 30% solids, BF Goodrich Co.) was combined with Eastek 1100 (a polyester dispersed in water 33% solids, Eastman Chemical Corp) and additional water to produce a solution that had a total solids of 20%. The ratio of these two polymers was such that the 20% solids solution produced dry coatings that were 80% Sancure 898 and 20% Eastek 1100.

EXAMPLE 3

(A Film Having a Structure with TAC Substrate, a Barrier a Layer and a Z Layer)

A barrier solution (barrier A formulation, 20% solids in water) was coated onto a TAC substrate. This included the steps of unrolling the roll of TAC substrate, coating the barrier solution (using a slot hopper), and applying sufficient drying (85° C.) to remove the majority of the water. Using a second slot hopper on the same coating machine, Polymer 1 (9% solids in propylacetate) was coated on top of the now dried barrier A layer. This second coating step was followed by sufficient drying (85° C.), thus removing the majority of the propylacetate. These steps occurred in a roll-to-roll, continuous process. Spin coating and other coating methods could also be used. Optically clear films of the TAC/barrier A/Polymer 1 structure were produced. Its properties were analyzed by an ellipsometer (model M2000V, J.A. Woollam Co.) at λ=550 nm. The retardation values for the layer of

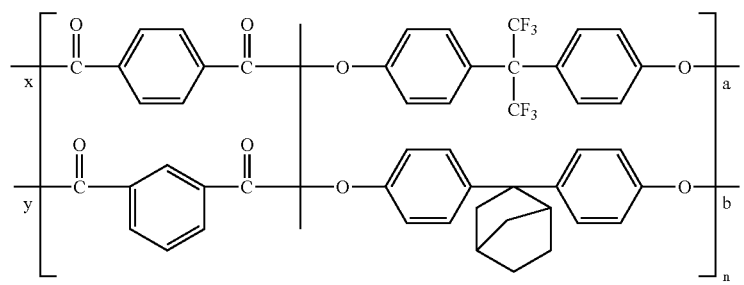

where x = 90, y = 10
and a = 70, b = 30 polyester were, Rin=2 nm, Rth=−150 nm. Results of the ellipsometer showed that the layer of polymer 1 satisfies the relations, $$|nx-ny|=0.0005<0.001 \tag{1}$$

$$\Delta n_{th}=nz-(nx+ny)/2=-0.0375<-0.005 \tag{2},$$

thus the layer of Polymer 1 was a Z layer. The adhesion of the Z layer to the TAC substrate was significantly improved compared to the case where no barrier A layer was used. Thus the barrier A layer also functioned as an adhesion promotion layer.

EXAMPLE 4

(Barrier B Formulation and Photo Cross Liking)

A coating solution of the following composition containing SK3200 (Sony Chemical Co.) was coated on the Z layer of Example 3 to create a barrier B layer using an extrusion hopper. The coated layer was dried and crosslinked using UV irradiation at λ=320 to 400 nm at 365 mJ/cm² to form a transparent barrier layer having a dried weight of 1.7 g/m².

Composition of the Coating Solution of Barrier Layer B:

| Propyl acetate | 85% |
| SK3200 | 15% |

EXAMPLE 5

(Alignment Layer)

On top of the barrier B layer of the Example 4, a photo-alignment layer (Staralign 2110, VANTICO Co.) was coated from the following solution to obtain a dry coverage of 0.076 g/m². The barrier layer B of Example 4 prevents the contamination of alignment layer by a chemical diffusion from the Z layer in Example 3. After drying to remove solvents, the sample was exposed to linearly polarized UVB at λ=308 nm using 10-30 mJ/cm² light at a 20° angle measured from the surface of the film.

Composition of the Coating Solution of the Alignment Layer:

| Staralign 2110 | 0.48% |
| Methyl ethyl ketone | 31.52% |
| Cyclohexanone | 22.75% |
| n-Propyl acetate | 40.00% |

EXAMPLE 6

(Optically Anisotropic (X) Layer)

A solution of a diacrylate nematic liquid crystal material, CB483 (VANTICO Co.) of the following composition was coated onto the alignment layer of Example 5 to obtain a dry coverage of 0.796 g/m². After drying, the coated structure was exposed to 400 mJ/cm² of UVA to crosslink the liquid crystal layer. This resulted in the liquid crystal retarder film.

Composition of the Coating Solution of the X Layer:

| LC material CB483 | 8.7% |
| Methyl ethyl ketone | 20.3% |
| Toluene | 62.00% |
| Ethyl acetate | 9.00% |

An analysis of the thus obtained film by an ellipsometer (model M2000V, J.A. Woollam Co.) at λ=550 nm shows that the layer of liquid crystal material CB483 is an positive O-plate, therefore it is a X layer.

The film has a structure such that TAC substrate, barrier A layer (also function as an adhesion promotion layer), Z layer, barrier B layer, alignment layer and a X layer.

The entire contents of the patents and other publications mentioned herein are incorporated herein.

PARTS LIST

| 101 | optic axis specified by the angles φ and θ |
| 201 | optic axis |
| 203 | plate |
| 301 | plate |
| 401 | mid-plane of the liquid crystal cell |
| 403 | optic axis of liquid crystal |
| 405 | liquid crystal cell boundary |
| 501 | X layer |
| 503 | Z layer |
| 505 | substrate |
| 507 | auxiliary layer |
| 509 | auxiliary layer |
| 511 | Z layer |
| 513 | X layer |
| 515 | auxiliary layer |
| 601 | TN-LCD |
| 603 | compensation film |
| 605 | compensation film |
| 607 | liquid crystal cell |
| 609 | polarizer |
| 611 | polarizer |
| 613 | transmission axis of polarizer 609 |
| 615 | transmission axis of polarizer 611 |
| nx | index of refraction in x direction |
| ny | index of refraction in y direction |
| nz | index of refraction in z direction |
| no | ordinary index of refraction |
| ne | extraordinary index of refraction |
| $\Delta n_{th}$ | out-of-plane birefringence |
| d | thickness of the layer or film |
| Rth | out-of-plane phase retardation |
| Rin | in-plane phase retardation |
| λ | wavelength |
| $T_g$ | glass transition temperature of polymer |

The invention claimed is:

1. A multilayer optical compensation film comprising one or more optically anisotropic layers X and one or more optically anisotropic layers Z wherein, said each layer X has its optic axis tilted with respect to the plane of said multilayer compensation film, and said each layer Z comprises amorphous polymer with glass transition temperature above 180C°, and satisfies the following two relations:

$$|nx-ny|<0.001 \tag{1}$$

$$\Delta n_{th}=nz-(nx+ny)/2<-0.005 \tag{2}$$

wherein:
"nx" and "ny" are indices of refraction in the film plane parallel to the x and y directions which represent orthogonal directions in the plane of the film;
"nz" is the index of refraction in the z-direction that corresponds to the film-thickness direction; and
"$\Delta n._{th}$", is the out of-plane birefringence,
wherein, one or more Z layers comprises a polymer selected from the group consisting of:
poly(4,4'-hexafluoroisopropylidene-bisphenol)terephthalate-co-isophthalate;
poly(4,4'-hexahydro-4,7-methanoindan-5-ylidene bisphenol)terephthalate;
poly(4,4'-isopropylidene-2,2'6,6'-tetrachlorobisphenol) terephthalate-co-isophthalate;

poly(4,4'-hexafluoroisopropylidene)-bisphenol-co-(2-norbornylidene)-bis-phenol terephthalate;

poly(4,4'-hexahydro-4,7-methanoindan-5-ylidene)-bisphenol-co-(4,4'-isopropylidene-2,2',6,6'-tetrabromo)-bisphenol terephthalate;

poly(4,4'-isopropylidene-bisphenol-co-4,4'-(2-norbornylidene)bisphenol)terephthalate-co-isophthalate;

poly(4,4'-hexafluoroisopropylidene-bisphenol-co-4,4'-(2-norbornylidene)bisphenol) terephthalate-co-isophthalate and copolymers thereof.

2. A multilayer optical compensation film according to claim 1 wherein, at least one X layer comprises positively birefringent material.

3. A multilayer optical compensation film according to claim 1 wherein, at least one X layer comprises negatively birefringent material.

4. A multilayer optical compensation film according to claim 1 wherein, the tilt angle θ of the optic axis with respect to the x-y plane of at least one X layer is constant in the thickness direction of the X layers.

5. A multilayer optical compensation film according to claim 1 wherein, the tilt angle θ of the optic axis with respect to the x-y plane of at least one X layer changes in the thickness direction of the X layers.

6. A multilayer optical compensation film according to claim 1 wherein, the azimuthal angle φ of the optic axis of at least one X layer is constant in the thickness direction of the X layers.

7. A multilayer optical compensation film according to claim 1 wherein, the azimuthal angle φ of the optic axis of at least one X layer changes in the thickness direction of the X layers.

8. A multilayer optical compensation film according to claim 1 wherein, the layers X and the layers Z are disposed on a substrate.

9. A multilayer optical compensation film according to claim 1 wherein, one or more adhesion promotion layers is disposed within the compensation film.

10. A multilayer optical compensation film according to claim 9 wherein, at least one of the adhesion promotion layers functions also as alignment layer.

11. A multilayer optical compensation film according to claim 9 wherein, at least one of the adhesion promotion layers functions also as barrier layer.

12. A multilayer optical compensation film according to claim 1 wherein, one or more alignment layers is disposed within the compensation film.

13. A multilayer optical compensation film according to claim 12 wherein, at least one of the alignment layers functions also as barrier layer.

14. A multilayer optical compensation film according to claim 1 wherein, one or more barrier layer is disposed within the compensation film.

15. A multilayer optical compensation film according to claim 1 wherein, one or more Z layers function as adhesion promotion layers.

16. A multilayer optical compensation film according to claim 1 wherein, one or more Z layers function as barrier layers.

17. A multilayer optical compensation film according to claim 1 wherein, one or more Z layers function as alignment layers.

18. A multilayer optical compensation film according to claim 1 wherein, one or more X layers function as adhesion promotion layers.

19. A multilayer optical compensation film according to claim 1 wherein, one or more X layers function as barrier layers.

20. A multilayer optical compensation film according to claim 1 wherein, one or more X layers function as alignment layers.

21. A multilayer optical compensation film according to claim 1 wherein, the thickness of each Z layer is from 0.1 to 20 μm.

22. A multilayer optical compensation film according to claim 21 wherein, the thickness of each Z layer is from 1.0 to 10.0 μm.

23. A multilayer optical compensation film according to claim 22 wherein, the thickness of each Z layer is from 2.0 to 8.0 μm.

24. A multilayer optical compensation film according to claim 1 wherein, the thickness of said compensation film is less than 50 μm.

25. A multilayer optical compensation film according to claim 24 wherein, the thickness of said compensation film is from 4 to 45 μm.

26. A multilayer optical compensation film according to claim 25 wherein, the thickness of said compensation film is from 5 to 20 μm.

27. A display comprising a) a liquid crystal cell, b) at least one polarizing element, and c) at least one optical compensation film according to claim 1.

28. A display according to claim 27 wherein, the liquid crystal cell is an Optically Compensated Bend mode cell.

29. A display according to claim 27 wherein, the liquid crystal cell is a Twisted Nematic mode cell.

30. A display according to claim 27 wherein, the liquid crystal cell is a Vertically Aligned mode cell.

31. A multilayer optical compensation film according to claim 1 wherein, one or more Z layers comprises a polymer containing a non-visible chromophore group which includes a carbonyl, amide, imide, ester, carbonate, phenyl, naphthyl, biphenyl, bisphenol, or thiophene group.

32. A multilayer optical compensation film according to claim 1 wherein, one or more Z layers comprises poly(4,4'-hexafluoroisopropylidene-bisphenol-co-4,4'-(2-norbornylidene)bisphenol) terephthalate-co-isophthalate or copolymers thereof.

33. A multilayer optical compensation film according to claim 1 wherein, the substrate of claim 8 is glass.

34. A multilayer optical compensation film according to claim 1 wherein, the substrate of claim 8 is comprised of triacetylcellulose, (TAC), cellulose acetate butyrate (CAB), polycarbonate or cyclic polyolefin.

35. A multilayer optical compensation film according to claim 1 wherein said polymer of said one or more Z layers is a poly(4,4'-hexafluoroisopropylidene-bisphenol-co-4,4'-(2-norbornylid-ene)bisphenol)terephthalate-co-isophthalate having the following chemical formula:

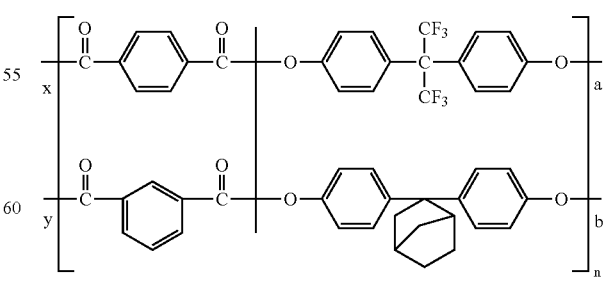

where x = 90, y = 10,
a = 70 and b = 30.